Jan. 8, 1929.

J. A. SPENCER 1,697,886

TEMPERATURE CONTROLLING APPARATUS

Filed June 1, 1922  2 Sheets-Sheet 1

Jan. 8, 1929.  1,697,886
J. A. SPENCER
TEMPERATURE CONTROLLING APPARATUS
Filed June 1, 1922    2 Sheets-Sheet 2
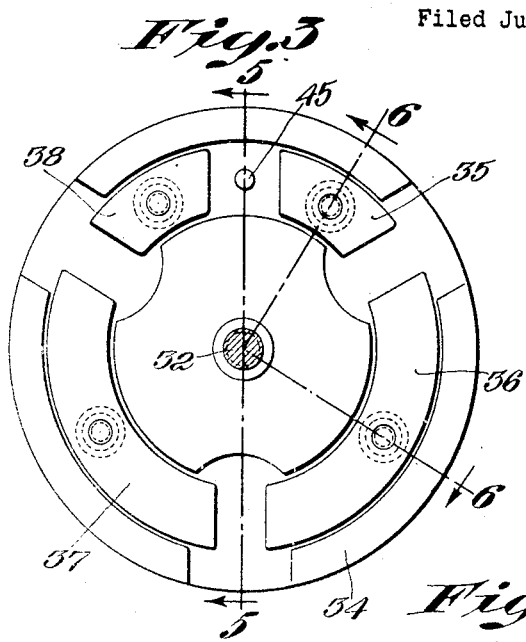
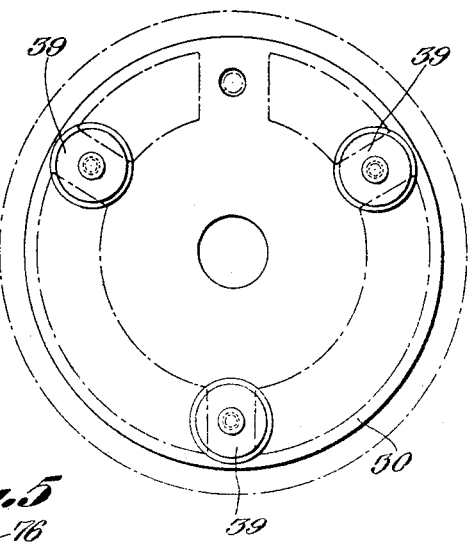
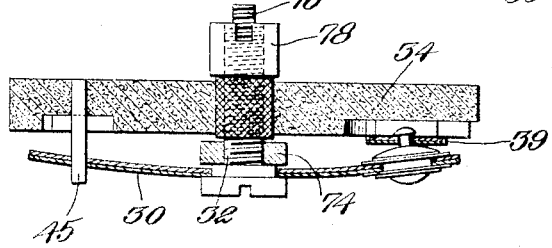
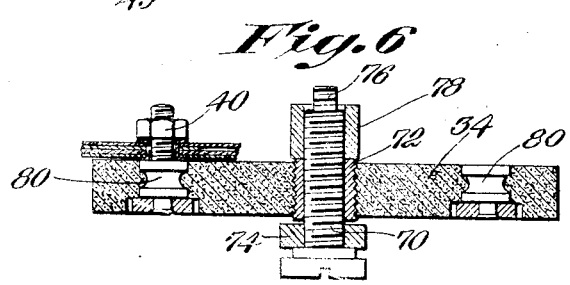
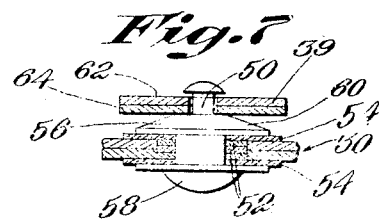
Witness
M. J. Crogin
Inventor
John A. Spencer
by his attorneys
Van Everen Fish Hildreth & Cory Patented Jan. 8, 1929.

1,697,886

UNITED STATES PATENT OFFICE.

JOHN A. SPENCER, OF REVERE, MASSACHUSETTS, ASSIGNOR TO SPENCER THERMOSTAT COMPANY, OF CAMBRIDGE, MASSACHUSETTS, A CORPORATION OF MASSACHUSETTS.

TEMPERATURE-CONTROLLING APPARATUS.

Application filed June 1, 1922. Serial No. 565,255.

The present invention relates to temperature controlled apparatus and more particularly to apparatus of this character designed for operating valves, switches and similar appurtenances when predetermined temperature limits are reached.

The copending application of Spencer, now Patent No. 1,448,240, granted March 13, 1923, discloses a thermostatic apparatus adapted to control the flow of heating current in a sadiron or similar construction. This apparatus is so designed that the circuit through which the heating current flows is instantly broken when the sadiron reaches certain predetermined upper temperature limits and is automatically closed when the temperature of the sadiron is lowered to a predetermined point.

The object of the present invention is to increase the efficiency and otherwise improve thermostatic apparatus of this general character, making it particularly useful for controlling electric circuits as well as valves and switches of various types.

With this object in view, the several features of the invention consist in certain novel features of construction, combinations and arrangements of parts hereinafter described and claimed, the advantages of which will be obvious to those skilled in the art from the following description.

Figure 1:
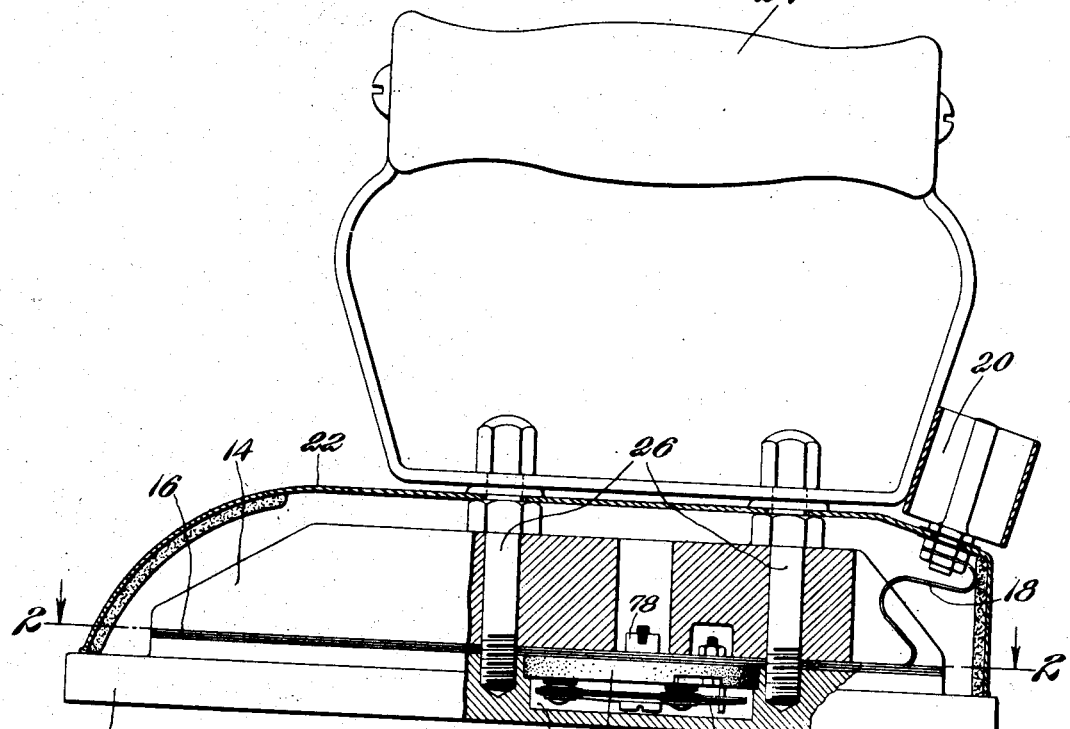
Figure 2:
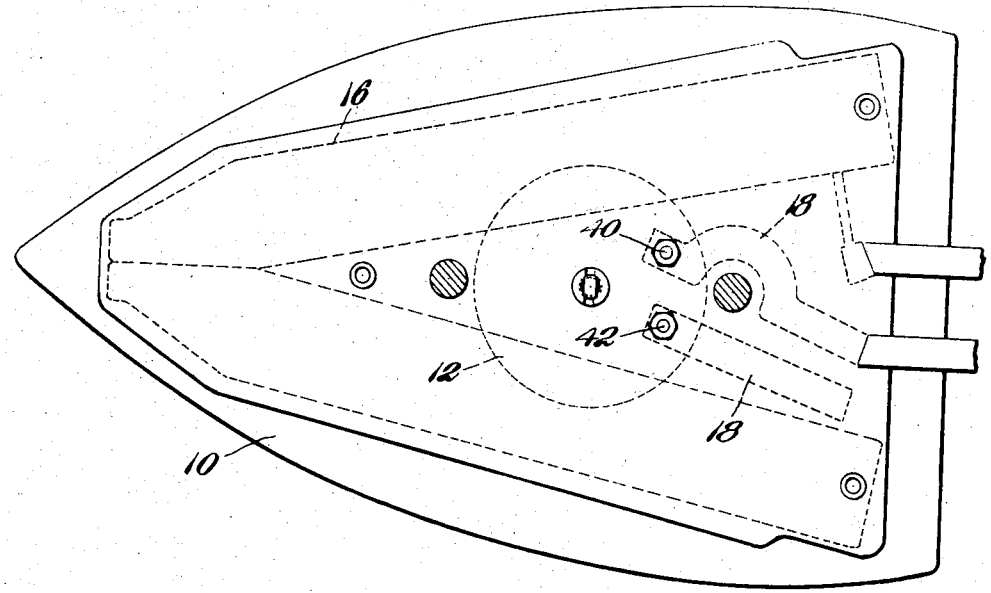

In the accompanying drawings Fig. 1 represents a section in elevation of the improved thermostatic control embodied in in a sadiron; Fig. 2 is a plan view of the iron; Figs. 3-6 are details illustrating different views of the control; and Fig. 7 is a view of one of the contact sectors with the accompanying mounting.

According to the present invention, the flow of electric current through the heater circuit is suddenly cut off when the temperature of the thermostatic control reaches certain upper limits. This opening of the heater circuit is accomplished in such a manner that all tendency to arc at the contact points is avoided, independently of whether the heater circuit is supplied with direct or alternating current. To this end, a thermostatic disk or member of the general type disclosed in the copending application of Spencer hereinbefore referred to may be employed. As previously described, this type of thermostatic desk changes shape suddenly upon reaching certain predetermined temperature limits, this sudden change of shape being relied upon to open or close the electric heater circuit of the sadiron. According to the present invention, this thermostatic member, upon changing shape, serves to suddenly open the heater circuit at a plurality of points in series so that the voltage across the contact points at the instant when the circuit is broken is invariably less than the total voltage impressed upon the heater circuit. In the illustrated embodiment of the invention, the circuit is broken by three separate contacts at each of which two breaks occur so that if the total voltage impressed upon the heater circuit approximates 110 volts the voltage across any one break at the instant the circuit is opened does not exceed a small fraction of this total impressed voltage.

Upon referring to the illustrated embodiment of the invention, it will be observed that the sadiron in which the thermostatic apparatus is embodied has a base member 10 provided with a recessed portion 12 in which the control apparatus is located. The base member is surmounted by a metallic block 14 with a heating element 16 of usual form interposed between the block and base member. The opposite sides of the heating element are connected in the usual manner through leads 18 with a terminal plug 20 mounted upon the rear portion of a sheet metal shell 22. The upper portion of the shell is provided with a handle 24, the handle, shell and base member being connected together by bolts 26. The flow of current through the heating circuit is controlled by a thermostatic member in the form of a curved disk 30, which is located within the recess 12. This thermostatic disk is connected at its central portion to a supporting stud 32, which, in turn is connected to and supported by an insulating member 34, which closes the recess 12. The insulating support 34 is provided with a series of stationary contact plates, indicated respectively at 35, 36, 37 and 38, disposed in a circular formation on the under-side of the insulating support and spaced away from one another in such a manner that they may be bridged by contact members carried upon the marginal portion of the thermostatic disk 30. The thermostatic disk is provided with a series of contact members 39, which are insulated from the disk and are arranged to simultaneously bridge the gaps formed between the ends of the contact plates 35 and 36, 36 and 37 and 37 and 38 to close the heater circuit at a plurality of points. The contact plates 35 and 38 are respectively connected with terminals 40 and 42, which extend through the insulating support and are adapted to be connected with opposite sides of the heater circuit. In order to insure that the thermostatic disk shall be permanently maintained in the same angular relation to the insulating support, a pin 45 may conveniently pass through the support and project into an opening formed in the disk, this pin serving to insure that the contacts 39 shall always register with the corresponding plates upon the insulating support. It will be obvious to those skilled in the art that in a construction of this type it is essential that contact shall be made through all of the various contact members and that the circuit shall be simultaneously opened through all of the contacts when it is desired to cut off the flow of heating current. In order to insure a good contact through all of the contact members 39, independently of slight irregularities in the shape of the thermostatic disk 30 or its position with relation to the contact plates, each one of the contact plugs 39 is connected to the disk in the manner shown in Fig. 7. According to this construction each of the contact disks 39 is loosely mounted upon a stud 50 which is connected to the peripheral portion of the thermostatic disk 30 and insulated therefrom by small insulating washers 52 and larger insulating washers 54. The connecting member may preferably take the form of a rivet of soft metal having cooperating heads 56 and 58, which serve to clamp the stem rigidly to the thermostatic disk together with the insulating washers. The head 56 is provided with a conical or arched surface 60, which permits a rocking or swiveling movement of the contact disk 39 about the stem 50, as indicated for example in Fig. 5. This permits the contact disk to seat upon the cooperating segments and bridge the space between. As shown, the contact disk may preferably consist of a sheet of silver 62, or other metal of relatively good conductivity, intimately joined to a backing 64 of supporting metal. With this construction, when the contact disks engage with the ends of opposing segments the current flows from one segment to the other through the layer of silver 62, which is of relatively higher conductivity than the remainder of the disk and the supporting stem. As shown in Figs. 5 and 6, the insulating support 34 consists of a disk of suitable material seated in the upper portion of the recess 12 and closing the latter. The thermostatic disk is supported by the member 34 through a stem 70 which is threaded in a sleeve 72 molded into the support 34. This stem is connected to the central portion of the thermostatic disk 30 and is provided with a lock nut 74 for holding the disk thereon. The stem may be adjusted within the sleeve 72 to vary the position of the thermostatic disk as a whole through the provision of an adjusting lug 76, the stem being retained in adjusted position by a lock nut 78. In this connection it will be observed that the thermostatic disk is connected to the stem in such a manner that the latter may be rotated for purposes of adjustment without compelling a like rotation of the disk, which is held in fixed position by the positioning pin 45. The stationary contact plates are conveniently located in a peripheral recess formed in the underside of the insulating support and are connected thereto by rivets 80 molded in the support, certain of these rivets being extended to form the terminal posts 40 and 42.

With this type of construction, when the temperature of the thermostatic member reaches certain predetermined limits, a sudden change in shape occurs, which simultaneously causes the heating circuit to be broken at a plurality of points. Due to this sudden breaking of the circuit simultaneously at a plurality of points, the formation of an arc is avoided even under adverse conditions and repeated operation of this apparatus over long periods does not cause the contact members to exhibit any injurious effect.

I claim:

1. Temperature controlled apparatus comprising a thermostatic disk, an interrupted contact strip, a series of contact members, mounted directly on the thermostatic disk and adapted to bridge the spaces in the contact strip, and an electric circuit including the contact strip.

2. Temperature controlled apparatus comprising an insulating support, a series of separated contact members mounted upon the support, an arched thermostatic disk, connections between the disk and support, a series of contact members mounted upon the disk and adapted to electrically connect the first mentioned contact members, and an electric circuit including the separated contact members and adapted to be closed through the contact members carried by the disk.

3. Temperature controlled apparatus comprising an insulating support, a series of separated contact members mounted upon the support, an arched thermostatic disk, connections between the disk and support, a series of contact members mounted upon the disk and adapted to electrically connect the first mentioned contact members, and means for bodily adjusting the disk and contact members carried thereby toward and from the first mentioned contact members.

4. Temperature controlled apparatus comprising an insulating support, a series of separated contact members mounted upon the support, an arched thermostatic disk, connections between the disk and support, a series of contact members mounted upon the disk and adapted to electrically connect the first mentioned contact members, and means for preventing rotation of the disk relative to the insulating support.

5. Temperature controlled apparatus comprising an insulating support, a series of separated contact members mounted upon the support, an arched thermostatic disk, connections between the disk and support, a series of spaced contact members mounted individually upon the disk and adapted to electrically connect the first mentioned contact members, means for preventing rotation of the disk relative to the support, and means for bodily adjusting the disk toward and from the support.

6. Temperature controlled apparatus comprising a thermostatic disk, separated contact segments, a plurality of contact disks carried by the thermostatic disk, connections between each of the contact disks and thermostatic disk for permitting an angular movement of the contact disk relative to the thermostatic disk, and an electric circuit including the stationary contact segments.

7. Temperature controlling apparatus comprising a thermostatic member cupped to change shape abruptly upon reaching a predetermined temperature, a mounting therefor, said thermostatic member having a plurality of spaced portions changing position when said temperature is reached, and a plurality of switches arranged in series with one another and each including movable contact means carried by said thermostatic member at one of said spaced portions.

8. A thermostatic circuit controlling device comprising an initially bent bimetallic element adapted to change abruptly from one position to another after preliminary distortions due to temperature variations, electrical contact means cooperating with at least one other contact to make and break a circuit, said electrical contact means moved by said bimetallic element into and out of operative engagement with said other contact and means for maintaining good electrical contact in the closed position during said preliminary distortions, said last named means being in operative association with said contact means.

9. A thermostatic circuit controlling device comprising an initially bent bimetallic element adapted to change abruptly from one position to another after preliminary distortions due to temperature variations, electrical contact means cooperating with at least one other contact to make and break a circuit, said electrical contact means moved by said bimetallic element into and out of operative engagement with said other contact, and means for allowing universal motion of the contact in its mounting so as allow for said preliminary distortions without causing any separation between contacts in the closed position, said last named means being in operative association with said contact means.

10. A thermostatic switch comprising a bimetallic member adapted to change abruptly from one position to another after preliminary distortions due to temperature variations, a plurality of electrical contacts cooperating with other contacts to make and break a circuit, said plurality of electrical contacts moved by said bimetallic member into and out of operative engagement with said other contacts, said contacts comprising means for mounting certain of said contacts so that sufficient relative motion between said contacts and their respective mountings is permitted to allow for said preliminary distortions of said bimetallic member without causing any separation between cooperating contacts when in closed position.

11. A thermostatic circuit controlling device comprising an initially bent bimetallic element adapted to change abruptly from one position to another after preliminary distortions due to temperature variations, electrical contact means cooperating with other contact means to make and break a circuit, said electrical contact means moved by said bimetallic element into and out of operative engagement with said other contact means, said moving contact means being mounted on said bimetallic element, said mounting allowing sufficient relative motion between said contact means and element so as to allow for said preliminary distortions without causing any separation between cooperating contacts in the closed position.

12. A thermostatic switch comprising a bimetallic member supported at only one place and being mechanically complete in itself as regards actions and reactions due to temperature variations, said member being so shaped that after preliminary distortions of shape, said members changes abruptly from one position into another position, a contact operated by said member and adapted to open or close a circuit through a cooperating contact, said contacts adapted to remain in good electrical contact in the closed position during said preliminary distortions.

13. A thermostatic switch comprising a bent bimetallic member, a stationary electrical contact, means for supporting said member at its center, and a contact mounted on said member and relatively movable to said stationary contact.

14. A thermostatic switch comprising a bent bimetallic member, a base, means centrally disposed with respect to said member for supporting it on said base, said member and base having cooperating contacts.

15. A thermostatic switch comprising a bent bimetallic member, a base, means centrally disposed with respect to said member for supporting it on said base, said member and base having cooperating contacts, said contacts being symmetrically located with respect to the center of the member.

16. A thermostatic switch comprising a bimetallic member adapted to change abruptly from one position to another after preliminary distortions due to temperature variations, a base member, means for supporting said bimetallic member at one spot of said bimetallic member on said base, contacts adapted to be opened and closed by the abrupt change of said bimetallic member, and means for maintaining said contacts in good electrical contact during said preliminary distortions when in closed position.

17. A thermostatic switch comprising a bimetallic member adapted to change abruptly from one position to another after preliminary distortions due to temperature variations, a base member, means for supporting said bimetallic member at one spot of said bimetallic member on said base, contacts adapted to be opened and closed by the abrupt change of said bimetallic member, and adjustable means for maintaining said contacts in good electrical contact during said preliminary distortions when in closed position.

18. A thermostatic switch comprising a bimetallic member having a non-developable surface, a base member, means for supporting said bimetallic member on said base member at a single spot of the former, said bimetallic member adapted to change abruptly from one position to another after preliminary distortions due to temperature variations, contacts made and broken by said abrupt change, and means for maintaining said contacts in good electrical contact during said preliminary distortions when in closed position.

19. A thermostatic switch comprising a bimetallic member, a base member, adjustable means for supporting said members relative to each other at only one spot on said bimetallic member, said bimetallic member being adapted to change abruptly from one position to another after preliminary distortions due to temperature changes.

20. The device of claim 19, said bimetallic and base members having contacts adapted to open and close by the abrupt change of said bimetallic member.

21. The device of claim 19, said bimetallic and base members having contacts adapted to open and close by the abrupt change of said bimetallic member, and means for maintaining good electrical contact between said contacts, when in closed position, during said preliminary distortions.

22. A thermostatic switch comprising a bent bimetallic member, a moulded base having contacts, said member having cooperating contacts, means supporting the center of said member on said base, said member being adapted to change abruptly from one position to another after preliminary distortions due to temperature variations, and means for mounting said contacts so that the contact surfaces remain coplanar during said preliminary distortions when closed.

23. The device of claim 22 wherein means are provided for changing the curvature of said member.

24. A thermostatic switch comprising a bimetallic member adapted to change abruptly from one position to another after preliminary distortions due to temperature variations, said bimetallic member assuming the shape of a compound curve during said distortions, stationary and movable contacts adapted to be opened and closed by the movement of an edge portion of said bimetallic member, and means for maintaining cooperating contacts in good electrical contact during said preliminary distortions when in closed position.

25. A thermostatic switch comprising a bimetallic member adapted to change abruptly from one position to another after preliminary distortions due to temperature variations, said bimetallic member assuming the shape of a compound curve during said distortions, a base, adjustable means between said base and member for varying said distortions, and stationary and movable contacts adapted to be opened and closed by the movement of an edge portion of said bimetallic member.

26. The device of claim 25, wherein the movable contact is so disposed relative to the actuating edge portion of said bimetallic member that sufficient motion between the movable contact and actuating edge portion is allowed so that good electrical contact is maintained in the closed position during said preliminary distortions.

27. A thermostatic switch comprising a bimetallic member adapted to change abruptly from one position to another after preliminary distortions due to temperature variations, said bimetallic member assuming the shape of a compound curve during said distortions, contacts adapted to be opened and closed by the movement of an edge portion of said bimetallic member, adjustable means acting on a spot within the boundaries of said bimetallic member to vary the distortions of said bimetallic member due to temperature variations, and means for keeping cooperating contacts from separating during the initial movements of said edge portions in response to the preliminary distortions.

28. A thermostatic switch comprising a bimetallic member adapted to change abruptly from one position to another after preliminary distortions due to temperature changes, said bimetallic member assuming the shape of a compound curve during said distortions, contacts adapted to be opened and closed by the movement of an edge portion of said bimetallic member, means remote from said actuating edge portion for varying said distortions, and means for keeping good electrical contact between cooperating contacts, when in closed position during said preliminary distortions.

29. The structure of claim 24 wherein the last designated means comprise a rocking means between the edge portion and contact.

30. The structure of claim 25 wherein the movable contacts have rocking means between the edge portion and contact.

31. A thermostatic switch comprising a bimetallic element adapted to change abruptly from one position to another, a base, means for supporting said element on said base, and means to adjust the position of said element with respect to said base.

32. A thermostatic switch comprising a curved bimetallic element adapted to change abruptly from one position to another, a base, means for mounting said element on said base, and means for adjusting the curvature of said element.

33. A thermostatic device comprising a bimetallic member having two positions of stable equilibrium with intermediate positions of unstable equilibrium, adjustable means engaging said member, at only one spot for mounting said member.

34. A thermostatic device comprising a curved bimetallic member having two positions of stable equilibrium with intermediate positions of unstable equilibrium, means engaging said member at one spot for mounting said member and means for adjusting the curvature of said member.

35. A thermostatic device comprising a bent bimetallic member having two positions of stable equilibrium with intermediate positions of unstable equilibrium, switching means operated by an edge portion of said member, means engaging said member at one spot for mounting said member and means for adjusting the curvature of said member.

JOHN A. SPENCER.